(12) United States Patent
Shi

(10) Patent No.: US 11,397,979 B2
(45) Date of Patent: Jul. 26, 2022

(54) ORDER PROCESSING METHOD AND DEVICE, SERVER, AND STORAGE MEDIUM

(71) Applicants: Beijing Jingdong Shangke Information and Technology Co., Ltd., Beijing (CN); Beijing Jingdong Century Trading Co., Ltd., Beijing (CN)

(72) Inventor: Guanyu Shi, Beijing (CN)

(73) Assignees: Beijing Jingdong Shangke Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 237 days.

(21) Appl. No.: 16/492,372

(22) PCT Filed: Mar. 26, 2018

(86) PCT No.: PCT/CN2018/080457
§ 371 (c)(1),
(2) Date: Sep. 9, 2019

(87) PCT Pub. No.: WO2018/188473
PCT Pub. Date: Oct. 18, 2018

(65) Prior Publication Data
US 2020/0043080 A1   Feb. 6, 2020

(30) Foreign Application Priority Data
Apr. 10, 2017   (CN) .......................... 201710229108.1

(51) Int. Cl.
*G06Q 30/00*   (2012.01)
*G06Q 30/06*   (2012.01)
*G06Q 10/08*   (2012.01)

(52) U.S. Cl.
CPC ..... *G06Q 30/0635* (2013.01); *G06Q 10/0875* (2013.01)

(58) Field of Classification Search
CPC ....................... G06Q 30/0635; G06Q 10/0875
See application file for complete search history.

(56) References Cited

U.S. PATENT DOCUMENTS 8,086,344 B1 * 12/2011 Mishra ............... G06Q 30/0283
700/216
11,037,081 B1 * 6/2021 Adnan ............ G06Q 10/06315
(Continued)

FOREIGN PATENT DOCUMENTS

| CN | 101968860 A | 2/2011 |
|---|---|---|
| CN | 103761635 A | 4/2014 |

(Continued)

OTHER PUBLICATIONS

Li, Xingyan, et al. "Using Kinect for monitoring warehouse order picking operations." Proceedings of Australasian Conference on Robotics and Automation. vol. 15. 2012.*

(Continued)

*Primary Examiner* — Kathleen Palavecino
(74) *Attorney, Agent, or Firm* — RatnerPrestia

(57) ABSTRACT

Disclosed in the present application is an order processing method and device, a server, and a storage medium. The method comprises: acquiring order information of a to-be-processed order, the order information including storage-bin region information and volume information of at least one item indicated by the order; base on the storage-bin region information and the volume information, determining whether the order satisfies following conditions: the at least one item indicated by the order being located within one storage-bin region and the a sum of the volumes of the at least one item being smaller than a volume threshold; and in response to the order satisfying the conditions, determining (Continued)

the order as a to-be-processed order, to generate a to-be-processed order set.

15 Claims, 5 Drawing Sheets

(56) References Cited

U.S. PATENT DOCUMENTS

| | | | | |
|---|---|---|---|---|
| 11,074,547 | B2* | 7/2021 | Rajkhowa | G06Q 10/04 |
| 2014/0351101 | A1* | 11/2014 | Danelski | G06Q 10/087 |
| | | | | 705/28 |
| 2018/0218440 | A1* | 8/2018 | Kumar | G06Q 30/0635 |
| 2018/0319592 | A1* | 11/2018 | Yamashita | B65G 1/0492 |
| 2020/0039747 | A1* | 2/2020 | Ahmann | B65G 1/1375 |

FOREIGN PATENT DOCUMENTS

| | | |
|---|---|---|
| CN | 105427065 A | 3/2016 |
| CN | 106327010 A | 1/2017 |
| CN | 106485448 A | 3/2017 |
| WO | 2013116620 A1 | 8/2013 |
| WO | 2014195902 A1 | 12/2014 |

OTHER PUBLICATIONS

International Search Report and Written Opinion for International Application No. PCT/CN2018/080457, dated Jul. 11, 2018, 5 pages.

* cited by examiner

ORDER PROCESSING METHOD AND DEVICE, SERVER, AND STORAGE MEDIUM

CROSS-REFERENCE TO RELATED APPLICATIONS

This application is a national stage of International Application No. PCT/CN2018/080457, filed on Mar. 26, 2018, which claims priority to Chinese Patent Application No. 201710229108.1, filed on Apr. 10, 2017, the contents of each of which are incorporated herein by reference in their entireties.

TECHNICAL FIELD

Embodiments of present disclosure relate to the field of computer technology, specifically to the field of warehouse logistics, and more specifically to a method, apparatus, server, and storage medium for order processing.

BACKGROUND

With the rapid development of e-commerce, arrangement of warehouse logistics has become a top priority for each e-commerce company. There are more and more large or ultra-large self-built warehouses, where a vast number of items will be stored. During make-to-order for a large warehouse, items contained in one order may be located at various corners throughout the warehouse, and the warehouse will often be faced with a large number of items and a large number of orders.

In related technologies, orders are processed less efficiently by a relatively monotonous approach, and the processing is labor-consuming. In such a situation, it is necessary to provide a novel approach for order processing to solve the above problems.

SUMMARY

An object of the embodiments of present disclosure is to provide an improved method, apparatus, server, and storage medium for order processing, to solve the technical problems mentioned in the background part.

In a first aspect, some embodiments of the present disclosure provide a method for order processing, including: acquiring order information of a to-be-processed order, the order information including storage-bin region information and volume information of at least one item indicated by the order; determining, based on the storage-bin region information and the volume information, whether the order satisfies following conditions: the at least one item indicated by the order being located within one storage-bin region, and a sum of volumes of the at least one item being below a volume threshold; and in response to the order satisfying the conditions, determining the order as a to-be-selected order to generate a to-be-selected order set.

In some embodiments, after the determining the order as a to-be-selected order to generate a to-be-selected order set, the method further includes: determining a volume difference between the volume threshold and the sum of the volumes, in response to the sum of the volumes of the at least one item indicated by the order being less than the volume threshold; determining whether there is a target order in a specified to-be-selected order set, the target order being a to-be-selected order having a sum of volumes of at least one item indicated whereby less than the volume difference; and incorporating, in response to there being the target order in the specified to-be-selected order set, the target order into the to-be-selected order set.

In some embodiments, the determining, based on the storage-bin region information and the volume information, whether the order satisfies following conditions: the at least one item indicated by the order being located within one storage-bin region, and a sum of volumes of the at least one item being below a volume threshold includes: determining whether the at least one item indicated by the order is located within the one storage-bin region based on the storage-bin region information; determining whether the sum of the volumes of the at least one item indicated by the order is below the volume threshold based on the volume information, in response to the at least one item indicated by the order being located within the one storage-bin region; and determining the order satisfying the conditions, in response to the sum of volumes of the at least one item indicated by the order being below the volume threshold.

In some embodiments, after the determining the order as a to-be-selected order to generate a to-be-selected order set, the method further includes: sending a spatial location allocation instruction to a spatial location allocating apparatus, the spatial location allocation instruction used for instructing the spatial location allocating apparatus to allocate a spatial location to the at least one item indicated by the to-be-selected order in the to-be-selected order set in a first preset container; acquiring a height of a highest point of the allocated spatial location of the at least one item and a height of a preset spatial location of the first preset container, to determine whether the height of the highest point of the allocated spatial location of the at least one item is higher than the height of the preset spatial location; and in response to the height of the highest point of the allocated spatial location of the at least one item being higher than the height of the preset spatial location, sending a spatial location change instruction to the spatial location allocating apparatus, the spatial location change instruction used for instructing the spatial location allocating apparatus to allocate the at least one item in the first preset container to a second preset container such that the height of the highest point of the spatial location of the at least item in the first preset container is below the height of the preset spatial location.

In some embodiments, after the determining whether the order satisfies following conditions: the at least one item indicated by the order being located within the one storage-bin region, and a sum of volumes of the at least one item being below a volume threshold, the method further includes: in response to the order not satisfying the conditions, determining whether the order matches a preset order; in response to the order matching the preset order, sending a storage-bin region allocation instruction to a storage-bin region allocating apparatus, the storage-bin region allocation instruction used for instructing the storage-bin region allocating apparatus to allocate the at least one item indicated by the order to the one storage-bin region; and executing the determining whether the order satisfies the conditions.

In a second aspect, some embodiments of the present disclosure provide an apparatus for order processing, including: an acquiring unit, configured to acquire order information of a to-be-processed order, the order information including storage-bin region information and volume information of at least one item indicated by the order; a determining unit, configured to determine, based on the storage-bin region information and the volume information, whether the order satisfies following conditions: the at least one item indicated by the order being located within one storage-bin region, and a sum of volumes of the at least one item being below a volume threshold; and a generating unit, configured to determine the order as a to-be-selected order to generate a to-be-selected order set, in response to the order satisfying the conditions.

In some embodiments, the apparatus further includes: a difference determining unit, configured to determine a volume difference between the volume threshold and the sum of the volumes, in response to the sum of the volumes of the at least one item indicated by the order being less than the volume threshold; a target determining unit, configured to determine whether there is a target order in a specified to-be-selected order set, the target order being a to-be-selected order having a sum of volumes of at least one item indicated whereby less than the volume difference; and an incorporating unit, configured to incorporate, in response to there being the target order in the specified to-be-selected order set, the target order into the to-be-selected order set.

In some embodiments, the determining unit is further configured to: determine whether the at least one item indicated by the order is located within one storage-bin region based on the storage-bin region information; determine whether the sum of the volumes of the at least one item indicated by the order is below the volume threshold based on the volume information, in response to the at least one item indicated by the order being located within the one storage-bin region; and determine the order satisfying the conditions, in response to the sum of the volumes of the at least one item indicated by the order being below the volume threshold.

In some embodiments, the apparatus further includes: an allocating unit, configured to send a spatial location allocation instruction to a spatial location allocating apparatus, the spatial location allocation instruction used for instructing the spatial location allocating apparatus to allocate a spatial location to the at least one item indicated by the to-be-selected order in the to-be-selected order set in a first preset container; a height determining unit, configured to acquire a height of a highest point of the allocated spatial location of the at least one item and a height of a preset spatial location of the first preset container, to determine whether the height of the highest point of the allocated spatial location of the at least one item is higher than the height of the preset spatial location; and a reallocating unit, configured to, in response to the height of the highest point of the allocated spatial location of the at least one item being higher than the height of the preset spatial location, send a spatial location change instruction to the spatial location allocating apparatus the spatial location change instruction used for instructing the spatial location allocating apparatus to allocate the at least one item in the first preset container to a second preset container such that the height of the highest point of the spatial location of the at least item in the first preset container is below the height of the preset spatial location.

In some embodiments, the apparatus further includes: a match determining unit, configured to determine whether the order matches a preset order, in response to the order not satisfying the conditions; an instructing unit, configured to send a storage-bin region allocation instruction to a storage-bin region allocating apparatus, in response to the order matching the preset order, the storage-bin region allocation instruction used for instructing the storage-bin region allocating apparatus to allocate the at least one item indicated by the order to the one storage-bin region; and an executing unit, configured to execute the determining whether the order satisfies the conditions.

The method and apparatus for order processing provided in the embodiments of the present disclosure acquire order information of a to-be-processed order, the order information including storage-bin region information and volume information of at least one item indicated by the order, then determine, based on the storage-bin region information and the volume information, whether the order satisfies following conditions: the at least one item indicated by the order being located within one storage-bin region, and a sum of volumes of the at least one item being below a volume threshold, and finally determine the order as a to-be-selected order to generate a to-be-selected order set, in response to the order satisfying the conditions. The embodiments of the present disclosure determine an order having items within one storage-bin region and a volume below a volume threshold, thereby determining obtaining the order indicating the items having a shorter distance between their storage locations and volumes meeting the requirement. Subsequent item selection and pick for such an order is less time-consuming, and such an order can be quickly processed, thereby improving the order processing efficiency. Moreover, the embodiments of the present disclosure further reduce the manpower consumption in the order processing.

BRIEF DESCRIPTION OF THE DRAWINGS

By reading detailed descriptions of non-limiting embodiments with reference to the following accompanying drawings, other features, objectives and advantages of the embodiments of the present disclosure will become more apparent.

DETAILED DESCRIPTION OF EMBODIMENTS

The embodiments of the present disclosure will be further described below in detail in combination with the accompanying drawings. It should be appreciated that the specific embodiments described herein are merely used for explaining the relevant disclosure, rather than limiting the disclosure. In addition, it should be further noted that, for the ease of description, only the parts related to the relevant disclosure are shown in the accompanying drawings.

It should be noted that the embodiments in the present disclosure and the features in the embodiments may be combined with each other on a non-conflict basis. Features of the present disclosure will be described below in detail with reference to the accompanying drawings and in combination with the embodiments.

Figure 1:
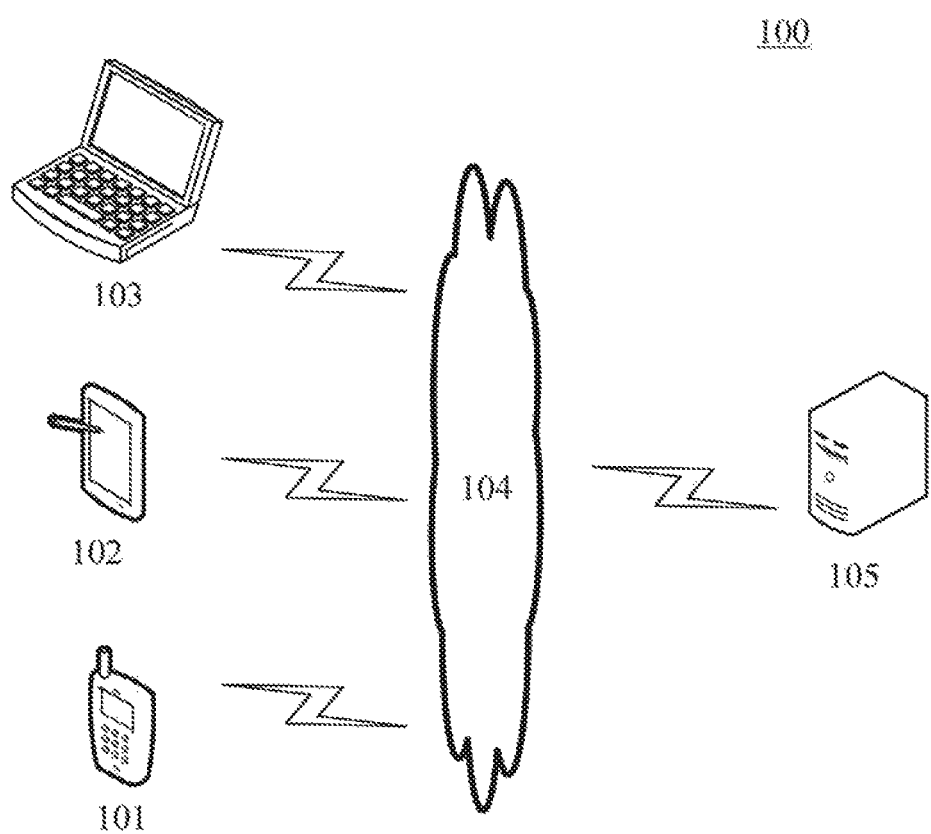
FIG. 1 is an architectural diagram of an exemplary system in which the embodiments of the present disclosure may be implemented.

FIG. 1 shows an exemplary system architecture 100 in which an embodiment of a method for order processing or an apparatus for order processing of the present disclosure may be implemented.

As shown in FIG. 1, the system architecture 100 may include terminal devices 101, 102, and 103, a network 104, and a server 105. The network 104 serves as a medium providing a communication link between the terminal devices 101, 102, and 103, and the server 105. The network 104 may include various types of connections, such as wired or wireless communication links, or optical fibers.

A user may interact with the server 105 using the terminal devices 101, 102, and 103 via the network 104, for example, to receive or send a message. The terminal devices 101, 102, and 103 may be provided with various client applications, such as a web browser application, a shopping application, a search application, an instant messaging tool, an email client, or social platform software.

The terminal devices 101, 102, and 103 may be various electronic devices having a display screen and supporting web browsing, including but not limited to a smart phone, a tablet computer, an e-book reader, an MP3 (Moving Picture Experts Group Audio Layer III) player, an MP4 (Moving Picture Experts Group Audio Layer IV) player, a laptop portable computer, a desktop computer, or the like.

The server 105 may be a server providing various services, such as a back-end web server providing support for webpages displayed on the terminal devices 101, 102, and 103. The back-end web server can process, e.g., analyze, data such as a page request for a received webpage, and return the processing result (e.g., page data of the webpage) to the terminal devices.

It should be noted that the method for order processing provided in the embodiments of the present disclosure is generally executed by the server 105. Accordingly, the apparatus for order processing is generally provided in the server 105.

It should be understood that the numbers of terminals, networks, and servers in FIG. 1 are merely illustrative. Any number of terminal devices, networks, and servers may be provided based on actual requirements.

Figure 2:
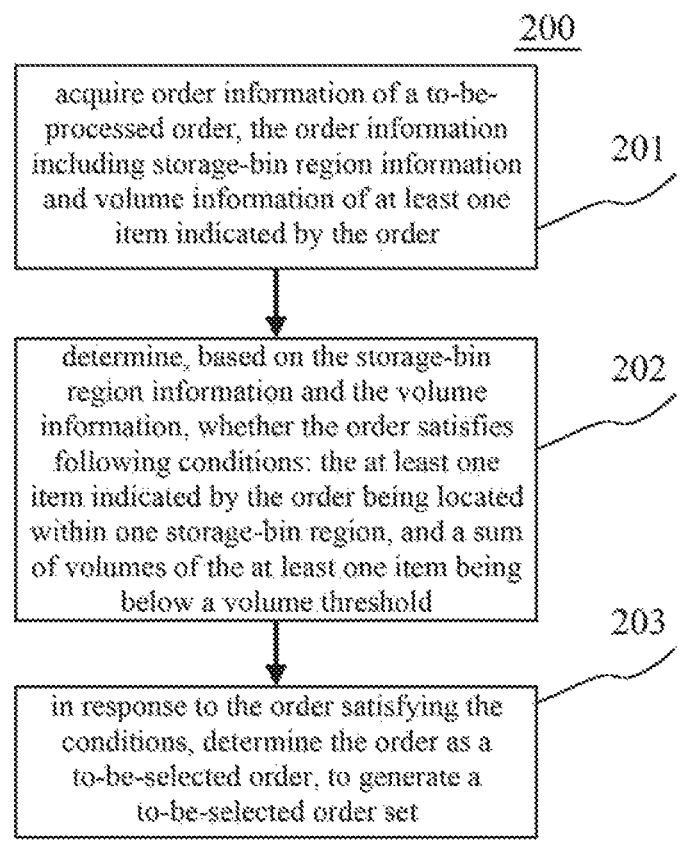
FIG. 2 is a flowchart of a method for order processing according to an embodiment of the present disclosure.

Further referring to FIG. 2, a process 200 of a method for order processing according to an embodiment of the present disclosure is shown. The method for order processing includes the following steps:

Step 201: acquiring order information of a to-be-processed order, the order information including storage-bin region information and volume information of at least one item indicated by the order.

In the present embodiment, an electronic device (e.g., the server shown in FIG. 1) on which the method for order processing runs can acquire the order information of the to-be-processed order from the electronic device or other electronic devices. The order information includes storage-bin region information of one or more items indicated by the order. The storage-bin region information is relevant information of a storage-bin region where storage bins of the items are located, and is used to denote a region where the storage bins of the items are located. Moreover, the order further includes volume information of the items. The volume information is relevant information of volumes of the items.

After a user places an order for one or more items, the electronic device can receive the order sent by a terminal. Here, the one or more items are items indicated by the order.

In general, only one kind of item is stored in each storage bin of a warehouse, but one kind of item may be stored in a plurality of storage bins. Storage-bin regions are regions obtained by sorting the storage bins based on locations. Specifically, the storage-bin region may be sorted by various approaches. For example, a plurality of storage bins at adjacent locations may be sorted into one storage-bin region, or items belonging to a given item category may be placed in adjacent storage bins, and these storage bins may be sorted as one storage-bin region.

The order information further includes volume information. The volume information denotes volumes of the items indicated by the order.

Step 202: determining, based on the storage-bin region information and the volume information, whether the order satisfies following conditions: the at least one item indicated by the order being located within one storage-bin region, and a sum of volumes of the at least one item being below a volume threshold.

In the present embodiment, the electronic device determines, based on the storage-bin region information and the volume information included in the order information acquired in the above step 201, whether the order satisfies the following conditions: the at least one item indicated by the order being located within one storage-bin region, and the sum of volumes of the at least one item being below the volume threshold. Only by satisfying both of the above two portions of the conditions, can the order satisfying the conditions be determined, thereby subsequent steps are executed.

In the warehouse, the storage bins of the items in the same storage-bin region are close to each other. Whether these items are close to each other can be obtained by determining whether the at least one item indicated by the order is located within one storage-bin region. The embodiment of the present disclosure not only defines the storage bin region of the items, but also defines the sum of volumes of these items, i.e., the sum of volumes is below a preset volume threshold. An order complying with the volume definition contributes more to the convenience of subsequent packaging using a selecting container of a united specification.

Step 203: determining the order being a to-be-selected order to generate a to-be-selected order set, if the order satisfies the conditions.

In the present embodiment, if determining that the order satisfies the above conditions, then the electronic device determines the order as a to-be-selected order, thereby generating the to-be-selected order set. Orders included in the to-be-selected order set are to-be-selected orders. The to-be-selected orders meet the storage-bin region requirements and the volume requirements.

If the items indicated by the order are located within one storage-bin region, there is a shorter distance between locations of the items here, thereby contributing more to the convenience of subsequent selecting and picking. In a process of selecting and picking items, less time may be spent to put the items indicated by the order into one container. Controlling the volume corresponding to the order to below the preset volume threshold can facilitate a subsequent process of loading into the container, and items of one order can be loaded into a container corresponding to the volume threshold without exceeding the accommodation capacity of the container.

In the present embodiment, a to-be-selected order set is generated to facilitate subsequently incorporating other to-be-selected orders into the set, and selecting and picking items with the incorporated to-be-selected order set as a selecting unit. The "selecting and picking" means to place the items from the storage bins into the container, to generate an item-carrying container corresponding to the order. Here, one container may correspond to one or more orders, so that items indicated by the one or more orders may be put into the container. Generally, in a process of order processing, item-carrying containers of one batch (or generated in one time period) can be processed through confluence, thereby putting these item-carrying containers in one delivery channel for item inspection. Therefore, waiting time will be generated in the confluence process because of slow generation of a given item-carrying container corresponding to an order of a batch, thereby further resulting in slowed order processing.

The present embodiment may not perform confluence on the item-carrying containers generated for the to-be-selected orders, and after determining the item-carrying container is the item-carrying container generated by the to-be-selected order set, item inspection can be directly performed without the need of waiting for other item-carrying containers.

In some alternative implementations of the present embodiment, the method further includes: determining whether the order matches a preset order, if the order fails to satisfy the conditions (the conditions in the above step 202); sending a storage-bin region allocation instruction to a storage-bin region allocating apparatus, if the order matches the preset order, the storage-bin region allocation instruction used for instructing the storage-bin region allocating apparatus to allocate the at least one item indicated by the order to one storage-bin region; and executing the determining whether the order satisfies the conditions.

If determining the order failing to satisfy the above conditions, then the order is compared with the preset order. If the comparison result is that the order is consistent with the preset order, then the order matching the preset order can be determined. Here, the preset order may be an order where the items carry a given identifier, for example, the items indicated by the order are items of a given brand; or an order where storage bins of the items are adjacent or have a shorter distance, or the like.

The storage-bin region allocating apparatus may transfer the storage bins of items into a target storage-bin region. After determining the order matching the preset order, the electronic device can send the storage-bin region allocation instruction to the storage-bin region allocating apparatus, to instruct the storage-bin region allocating apparatus to allocate the at least one item indicated by the order to one storage-bin region. Here, the "allocate the at least one item indicated by the order to one storage-bin region" means to transfer the items of the order located in different storage-bin regions into the given storage-bin region. For example, an item a, an item b, and an item c are located in different storage-bin regions, and the storage-bin region allocating apparatus can move the item b and the item c into the storage-bin region of the item a. After the above allocation, the determining whether the order satisfies the above conditions can be executed.

In an application scenario of the present embodiment, a processor of the server acquires order information of a to-be-processed order from a database of the server, the order information including storage-bin region information and volume information of the item a, the item b, and the item c indicated by the order; then the processor of the server determines, based on the storage-bin region information and the volume information, whether the order satisfies the following conditions: the item a, the item b, and the item c indicated by the order being located within one storage-bin region, and the sum of volumes of the item a, the item b, and the item c being below the volume threshold; and finally the processor of the server can determine the order as the to-be-selected order to generate the to-be-selected order set, if the above determining result is that the order satisfies the conditions.

The embodiments of the present disclosure determines that the order indicating the items having a shorter distance between their storage bin locations and the volumes meet the conditions is obtained, by determining an order having items within a given storage-bin region and a volume below a volume threshold. Subsequent item selecting and picking for such an order is less time-consuming, and such an order can be quickly processed, thereby improving the order processing efficiency. Moreover, the embodiments of the present disclosure further reduce the manpower consumption in the order processing.

Figure 3:
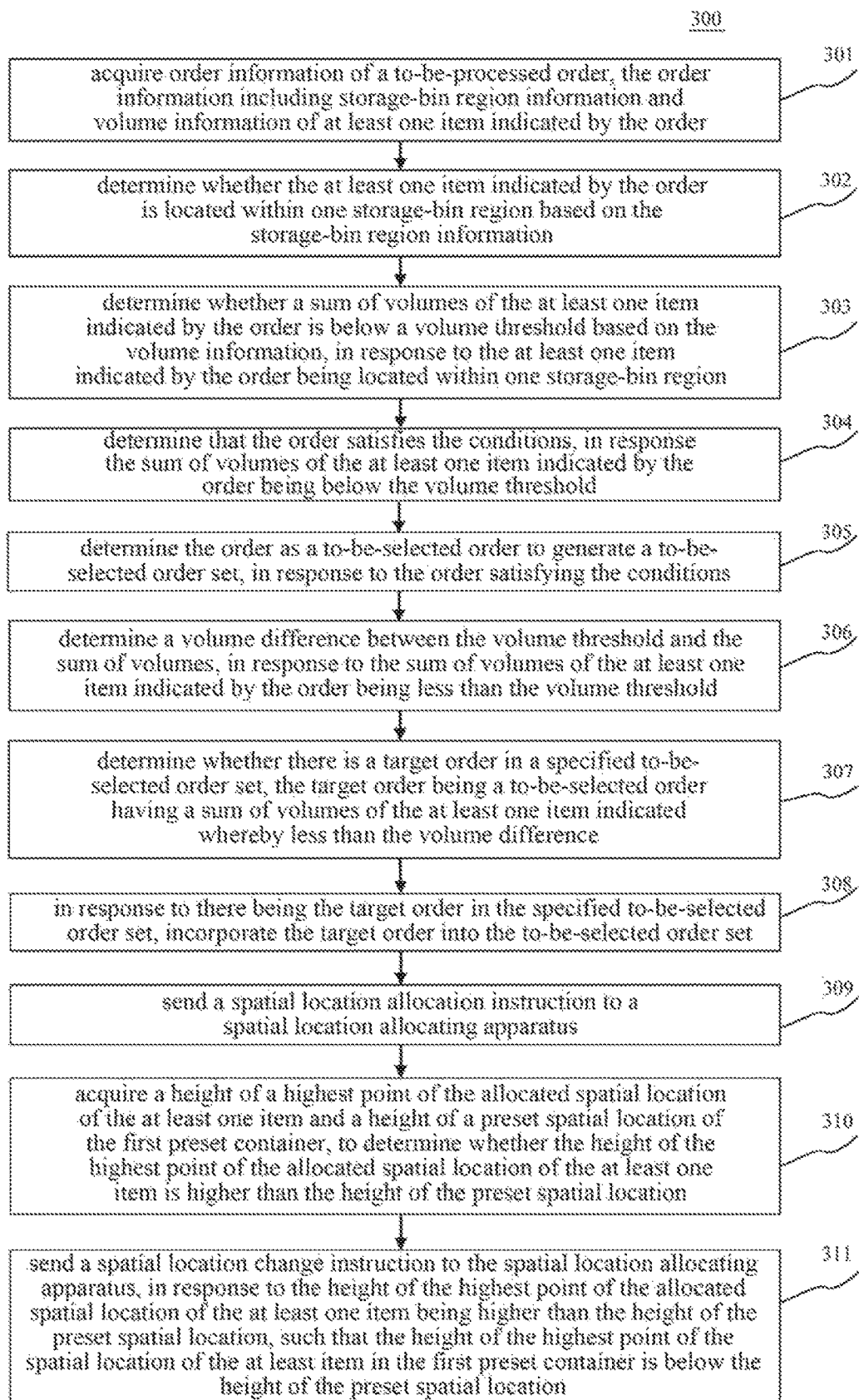
FIG. 3 is a flowchart of the method for order processing according to another embodiment of the present disclosure.

Further referring to FIG. 3, a process 300 of another embodiment of the method for order processing is shown. The process 300 of the method for order processing includes the following steps:

Step 301: acquiring order information of a to-be-processed order, the order information including storage-bin region information and volume information of at least one item indicated by the order.

In the present embodiment, an electronic device (e.g., the server shown in FIG. 1) on which the method for order processing runs can acquire the order information of the to-be-processed order from the electronic device or other electronic devices. The order information includes storage-bin region information of one or more items indicated by the order, and is used to denote an area where the storage bins of the items are located. In addition, the order further includes volume information of the items.

Step 302: determining whether the at least one item indicated by the order is located within one storage-bin region based on the storage-bin region information.

In the present embodiment, the electronic device can determine whether the respective storage bin regions of the items indicated by the order are identical based on the storage-bin region information, and then determine whether these items are located within one storage-bin region.

Step 303: determining whether a sum of volumes of the at least one item indicated by the order is below a volume threshold based on the volume information, if the at least one item indicated by the order is located within one storage-bin region.

In the present embodiment, if storage-bin regions where the items indicated by the order are located respectively are identical, then these items being located within one storage-bin region can be determined. The electronic device can determine whether the sum of volumes of the items indicated by the order is below the preset volume threshold based on the volume information.

If the items indicated by the order are located within one storage bin, then there is a shorter distance between these items, and excessive time for goods transport will not be consumed because of selecting and picking items in longer distance into a container.

Step 304: determining the order satisfying the conditions, if the sum of volumes of the at least one item indicated by the order is below the volume threshold.

In the present embodiment, if the sum of volumes of the items indicated by the order is below the preset volume threshold, then the order satisfies both the storage-bin region and volume portions of the above conditions, and therefore, the order satisfying the above conditions is determined.

If the sum of volumes of the items indicated by the order is below the volume threshold, then the items indicated by the order facilitate selecting and picking, and thus a process of delivering the items from a warehouse is continued. The problem of requiring to put the items indicated by one order into a plurality of containers will not be caused easily by a very large sum of volumes.

Step 305: determining the order as a to-be-selected order, to generate a to-be-selected order set, if the order satisfies the conditions.

In the present embodiment, if determining the order satisfying the above conditions, then the electronic device determines the order as the to-be-selected order, thereby generating the to-be-selected order set. Orders included in the to-be-selected order set are to-be-selected orders. The to-be-selected orders meet the storage-bin region requirements and the volume requirements.

Step 306: determining a volume difference between the volume threshold and the sum of volumes, if the sum of volumes of the at least one item indicated by the order is less than the volume threshold.

In the present embodiment, the sum of volumes of the at least one item indicated by the order being below the volume threshold has been determined in the above step 304, so that the volume threshold is greater than or equal to the sum of volumes. If the volume threshold is greater than the sum of volumes, then the electronic device further calculates the volume difference between the two.

Step 307: determining whether there is a target order in a specified to-be-selected order set, the target order being a to-be-selected order having a sum of volumes of the at least one item indicated whereby less than the volume difference.

In the present embodiment, the electronic device can specify some to-be-processed orders to form a specified to-be-processed order set. The electronic device determines whether there is the target order in the set. Here, the target order is a to-be-selected order, and the sum of volumes of the items indicated by the target order is less than the volume difference.

Step 308: incorporating, if there is the target order in the specified to-be-selected order set, the target order into the to-be-selected order set.

In the present embodiment, if determining that there is the target order, then the target order is incorporated into the to-be-selected order set, to facilitate subsequently allocating the items indicated by the orders in the to-be-selected order set to a container corresponding to the volume threshold.

The target order is incorporated into the to-be-selected order set, to make full use of the container capacity when allocating items in the container.

Step 309: sending a spatial location allocation instruction to a spatial location allocating apparatus, the spatial location allocation instruction used for instructing the spatial location allocating apparatus to allocate a spatial location to the at least one item indicated by the to-be-selected order in the to-be-selected order set in a first preset container.

In the present embodiment, the spatial location allocation instruction is sent to the spatial location allocating apparatus. The spatial location allocation instruction is used for instructing the spatial location allocating apparatus to allocate a spatial location to the at least one item indicated by the orders in the to-be-selected order set in the first preset container. That is, stacking the above items in the first preset container.

The first preset container refers to a preset container configured for being stacked with items. The spatial location allocating apparatus refers to an apparatus for allocating spatial locations to items.

Step 310: acquiring a height of a highest point of the allocated spatial location of the at least one item and a height of a preset spatial location of the first preset container, to determine whether the height of the highest point of the allocated spatial location of the at least one item is higher than the height of the preset spatial location.

In the present embodiment, the electronic device acquires the height of the highest point of the spatial location of the items in the first preset container detected by a detecting device, compares the height with the height of the preset spatial location of the container, and determines the height of the highest point of the allocated spatial location of the at least one item being higher than the height of the preset spatial location of the first preset container, if the height of the former of the two is higher.

Step 311: in response to the height of the highest point of the allocated spatial location of the at least one item being higher than the height of the preset spatial location, sending a spatial location change instruction to the spatial location allocating apparatus, the spatial location change instruction used for instructing the spatial location allocating apparatus to allocate the at least one item in the first preset container to a second preset container, such that the height of the highest point of the spatial location of the at least item in the first preset container is below the height of the preset spatial location.

In the present embodiment, if determining that the height of the highest point of the allocated spatial location of the at least one item is higher than the height of the preset spatial location of the first preset container, it is indicated that the items in the first preset container exceed an accommodation capacity of the container. Therefore, the electronic device sends the spatial location change instruction to the spatial location allocating apparatus. The spatial location change instruction is used for instructing the spatial location allocating apparatus to allocate the at least one item in the first preset container to the second preset container. After the allocation, the height of the highest point of the spatial location of the items in the first preset container is required to be below the height of the preset spatial location.

The second preset container refers to another preset container configured for being stacked with items. The spatial location allocating apparatus needs to allocate the items from the first preset container to the second preset container by taking out the items from the first preset container, and then putting the items into the second preset container. Here, the items that are taken out may be items that are randomly taken out by the spatial location allocating apparatus, or items of smallest volume in the first preset container that are taken out by the spatial location allocating apparatus, or items corresponding to the highest point of the spatial location of the items in the first preset container, or the like. The height of the preset spatial location may be determined for use as a height of the main body edge of the first preset container.

For example, if the first preset container is a box, the height of the box body edge of the box may be used as the height of the preset spatial location.

With the above allocating steps, the problem of failure to package the items in the first preset container can be avoided.

Figure 4:
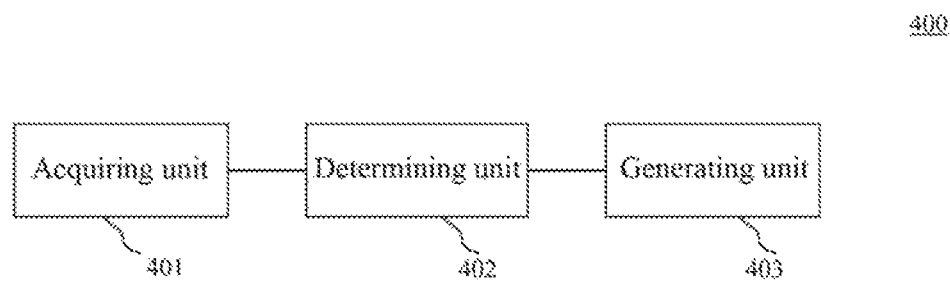
FIG. 4 is a schematic structural diagram of an apparatus for order processing according to an embodiment of the present disclosure.

Further referring to FIG. 4, as an implementation of the method shown in the above figures, the present disclosure provides an embodiment of an apparatus for order processing. The embodiment of the apparatus corresponds to the embodiment of the method shown in FIG. 2, and the apparatus may be specifically applied to various electronic devices.

As shown in FIG. 4, the apparatus 400 for order processing of the present embodiment includes: an acquiring unit 401, configured to acquire order information of a to-be-processed order, the order information including storage-bin region information and volume information of at least one item indicated by the order; a determining unit 402, configured to determine, based on the storage-bin region information and the volume information, whether the order satisfies following conditions: the at least one item indicated by the order being located within one storage-bin region, and a sum of volumes of the at least one item being below a volume threshold; and a generating unit 403, configured to determine the order as a to-be-selected order to generate a to-be-selected order set, in response to the order satisfying the conditions.

In the present embodiment, the acquiring unit 401 of the apparatus 400 for order processing can acquire the order information of the to-be-processed order from the above electronic device or other electronic devices. The order information includes the storage-bin region information of one or more items indicated by the order, and is used to denote a region where the storage bins of the items are located. In addition, the order further includes volume information of the items.

In the present embodiment, the determining unit 402 determines, based on the acquired order information, whether the order satisfies the following conditions: the at least one item indicated by the order being located within one storage-bin region, and a sum of volumes of the at least one item being below a volume threshold. Only by satisfying both of the above two portions of the conditions, can the order satisfying the conditions be determined, thereby executing subsequent steps.

In the present embodiment, if determining the order satisfying the above conditions, then the generating unit 403 determines the order as a to-be-selected order, thereby generating a to-be-selected order set. Orders included in the to-be-selected order set are to-be-selected orders. The to-be-selected orders meet the storage-bin region requirements and the volume requirements.

In some alternative implementations of the present embodiment, the apparatus 400 for order processing further includes: a difference determining unit (not shown), configured to determine a volume difference between the volume threshold and the sum of volumes, in response to the sum of the volumes of the at least one item indicated by the order being less than the volume threshold; a target determining unit (not shown), configured to determine whether there is a target order in a specified to-be-selected order set, the target order being a to-be-selected order having a sum of volumes of at least one item indicated whereby less than the volume difference; and an incorporating unit (not shown), configured to incorporate, in response to there being the target order in the specified to-be-selected order set, the target order into the to-be-selected order set.

In some alternative implementations of the present embodiment, the determining unit 402 is further configured to: determine whether the at least one item indicated by the order is located within the one storage-bin region based on the storage-bin region information; determine whether the sum of the volumes of the at least one item indicated by the order is below the volume threshold based on the volume information, in response to the at least one item indicated by the order being located within the one storage-bin region; and determine the order satisfying the conditions, in response to the sum of the volumes of the at least one item indicated by the order being below the volume threshold.

In some alternative implementations of the present embodiment, the apparatus 400 for order processing further includes: an allocating unit (not shown), configured to send a spatial location allocation instruction to a spatial location allocating apparatus, the spatial location allocation instruction used for instructing the spatial location allocating apparatus to allocate a spatial location to the at least one item indicated by the to-be-selected order in the to-be-selected order set in a first preset container; a height determining unit (not shown), configured to acquire a height of a highest point of the allocated spatial location of the at least one item and a height of a preset spatial location of the first preset container, to determine whether the height of the highest point of the allocated spatial location of the at least one item is higher than the height of the preset spatial location; and a reallocating unit (not shown), configured to, in response to the height of the highest point of the allocated spatial location of the at least one item being higher than the height of the preset spatial location, send a spatial location change instruction to the spatial location allocating apparatus, the spatial location change instruction used for instructing the spatial location allocating apparatus to allocate the at least one item in the first preset container to a second preset container such that the height of the highest point of the spatial location of the at least item in the first preset container is below the height of the preset spatial location.

In some alternative implementations of the present embodiment, the apparatus 400 for order processing further includes: a match determining unit (not shown), configured to determine whether the order matches a preset order, in response to the order not satisfying the conditions; an instructing unit (not shown), configured to send a storage-bin region allocation instruction to a storage-bin region allocating apparatus, in response to the order matching the preset order, the storage-bin region allocation instruction used for instructing the storage-bin region allocating apparatus to allocate the at least one item indicated by the order to the one storage-bin region; and an executing unit (not shown), configured to execute the determining whether the order satisfies the conditions.

Figure 5:
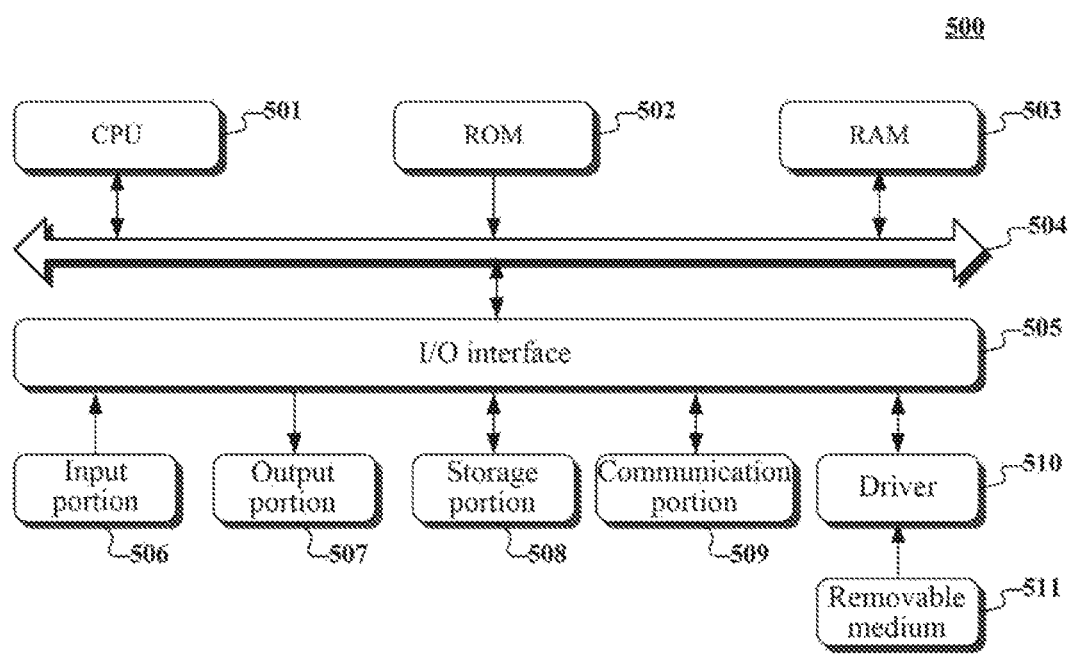
FIG. 5 is a schematic structural diagram of a computer system adapted to implement a server of some embodiments of the present disclosure.

Referring to FIG. 5 below, a schematic structural diagram of a computer system 500 adapted to implement a server of embodiments of the present disclosure is shown. The server shown in FIG. 5 is merely an example, and should not limit the functions and scope of use of the embodiments of the present disclosure.

FIG. 5 shows a schematic structural diagram of a computer system adapted to implement a server of embodiments of the present disclosure. As shown in FIG. 5, the computer system 500 includes a central processing unit (CPU) 501, which may execute various appropriate actions and processes in accordance with a program stored in a read only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse, or the like; an output portion 507 including a cathode ray tube (CRT), a liquid crystal display device (LCD), a speaker, or the like; a storage portion 508 including a hard disk, or the like; and a communication portion 509 including a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, so that a computer program read therefrom is installed on the storage portion 508 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a computer readable medium. The computer program includes program codes for executing the method as illustrated in the flow chart. In such an embodiment, the computer program may be downloaded and installed from a network via the communication portion 509, and/or may be installed from the removable medium 511. The computer program, when executed by the central processing unit (CPU) 501, implements the above functions as defined by the method of the present disclosure. It should be noted that the computer readable medium of the present disclosure may be a computer readable signal medium or a computer readable storage medium or any combination of the above two. An example of the computer readable storage medium may include, but is not limited to: electric, magnetic, optical, electromagnetic, infrared, or semiconductor systems, apparatuses, elements, or a combination of any of the above. A more specific example of the computer readable storage medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In some embodiments of the present disclosure, the computer readable storage medium may be any tangible medium containing or storing programs, which may be used by a command execution system, apparatus or element, or incorporated thereto. In some embodiments of the present disclosure, the computer readable signal medium may include a data signal in the base band or propagating as a part of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logical functions. It should be further noted that, in some alternative implementations, the functions denoted by the blocks may occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in the embodiments of the present disclosure may be implemented by means of software or hardware. The described units may also be provided in a processor, for example, described as: a processor, including an acquiring unit, a determining unit, and a generating unit. The names of the units do not constitute a limitation to such units themselves in some cases. For example, the acquiring unit may be further described as "a unit configured to acquire order information of a to-be-processed order."

In another aspect, some embodiments of the present disclosure further provides a computer readable medium. The computer readable medium may be included in the apparatus in the above described embodiments, or a stand-alone computer readable medium without being assembled into the apparatus. The computer readable medium stores one or more programs. The one or more programs, when executed by the apparatus, cause the apparatus to: acquire order information of a to-be-processed order, the order information including storage-bin region information and volume information of at least one item indicated by the order; determine, based on the storage-bin region information and the volume information, whether the order satisfies the following conditions: the at least one item indicated by the order being located within one storage-bin region, and a sum of volumes of the at least one item being below a volume threshold; and in response to the order satisfying the conditions, determine the order as a to-be-selected order, to generate a to-be-selected order set.

The above description only provides explanation of the preferred embodiments of the present disclosure and the employed technical principles. It should be appreciated by those skilled in the art that the inventive scope of the present disclosure is not limited to the technical solutions formed by the particular combinations of the above-described technical features. The inventive scope should also cover other technical solutions formed by any combination of the above-described technical features or equivalent features thereof without departing from the concept of the disclosure, for example, technical solutions formed by the above-described features being interchanged with, but not limited to, technical features with similar functions disclosed in the embodiments of the present disclosure.

What is claimed is:

1. A method for order processing, comprising:
   acquiring, by an electronic device, order information of a to-be-processed order from a terminal, the order information including storage-bin region information and volume information of at least one item indicated by the order;
   determining, by the electronic device, based on the storage-bin region information and the volume information, whether the order satisfies following conditions: the at least one item indicated by the order being located within one storage-bin region of a warehouse, and a sum of volumes of the at least one item being below a volume threshold; and
   in response to the order satisfying the conditions, determining by the electronic device the order as a to-be-selected order, to generate a to-be-selected order set,
   in response to the order not satisfying the conditions and the order matching a preset order, sending by the electronic device a storage-bin region allocation instruction to a storage-bin region allocating apparatus, for instructing the storage-bin region allocating apparatus to move the at least one item indicated by the order into the one storage-bin region of the warehouse, and returning to execute the determining whether the order satisfies the conditions; and sending, by the electronic device, a spatial location allocation instruction to a spatial location allocating apparatus, for instructing the spatial location allocating apparatus to stack at least one item indicated by a to-be-selected order in the to-be-selected order set into a first preset container, wherein the method further comprises:

moving, by the storage-bin region allocating apparatus, in response to the storage-bin region allocation instruction, the at least one item indicated by the order into the one storage-bin region of the warehouse; and stacking, by the spatial location allocating apparatus, in response to the spatial location allocation instruction, the at least one item indicated by the to-be-selected order in the to-be-selected order set into the first preset container.

2. The method for order processing according to claim 1, wherein after the determining the order as a to-be-selected order, to generate a to-be-selected order set, the method further comprises:

determining a volume difference between the volume threshold and the sum of the volumes, in response to the sum of the volumes of the at least one item indicated by the order being less than the volume threshold;

determining whether there is a target order in a specified to-be-selected order set, the target order being a to-be-selected order having a sum of volumes of at least one item indicated whereby less than the volume difference; and incorporating the target order into the to-be-selected order set, in response to there being the target order in the specified to-be-selected order set.

3. The method for order processing according to claim 1, wherein the determining, based on the storage-bin region information and the volume information, whether the order satisfies following conditions: the at least one item indicated by the order being located within one storage-bin region, and a sum of volumes of the at least one item being below a volume threshold comprises:

determining whether the at least one item indicated by the order is located within the one storage-bin region based on the storage-bin region information;

determining whether the sum of the volumes of the at least one item indicated by the order is below the volume threshold based on the volume information, in response to the at least one item indicated by the order being located within the one storage-bin region; and determining the order satisfying the conditions, in response to the sum of the volumes of the at least one item indicated by the order being below the volume threshold.

4. The method for order processing according to claim 1, wherein after the determining the order as a to-be-selected order to generate a to-be-selected order set, the method further comprises:

sending a spatial location allocation instruction to a spatial location allocating apparatus, the spatial location allocation instruction used for instructing the spatial location allocating apparatus to allocate a spatial location to the at least one item indicated by the to-be-selected order in the to-be-selected order set in a first preset container;

acquiring a height of a highest point of the allocated spatial location of the at least one item and a height of a preset spatial location of the first preset container, to determine whether the height of the highest point of the allocated spatial location of the at least one item is higher than the height of the preset spatial location; and in response to the height of the highest point of the allocated spatial location of the at least one item being higher than the height of the preset spatial location, sending a spatial location change instruction to the spatial location allocating apparatus, the spatial location change instruction used for instructing the spatial location allocating apparatus to allocate the at least one item in the first preset container to a second preset container such that the height of the highest point of the spatial location of the at least item in the first preset container is below the height of the preset spatial location.

5. The method for order processing according to claim 1, wherein the preset order comprises items having identical identifiers, or storage bins of items comprised in the present order are adjacent.

6. An apparatus for order processing, comprising:

at least one processor; and a memory storing instructions, the instructions when executed by the at least one processor, cause the at least one processor to perform operations, the operations comprising:

acquiring order information of a to-be-processed order from a terminal, the order information including storage-bin region information and volume information of at least one item indicated by the order;

determining, based on the storage-bin region information and the volume information, whether the order satisfies following conditions: the at least one item indicated by the order being located within one storage-bin region of a warehouse, and a sum of volumes of the at least one item being below a volume threshold; and determining the order as a to-be-selected order to generate a to-be-selected order set, in response to the order satisfying the conditions, in response to the order not satisfying the conditions and the order matching a preset order, sending by the electronic device a storage-bin region allocation instruction to a storage-bin region allocating apparatus, for instructing the storage-bin region allocating apparatus to move the at least one item indicated by the order into the one storage-bin region of the warehouse, and returning to execute the determining whether the order satisfies the conditions; and sending, by the electronic device, a spatial location allocation instruction to a spatial location allocating apparatus, for instructing the spatial location allocating apparatus to stack at least one item indicated by a to-be-selected order in the to-be-selected order set into a first preset container, wherein the operations further comprise:

moving, by the storage-bin region allocating apparatus, in response to the storage-bin region allocation instruction, the at least one item indicated by the order into the one storage-bin region of the warehouse; and stacking, by the spatial location allocating apparatus, in response to the spatial location allocation instruction, the at least one item indicated by the to-be-selected order in the to-be-selected order set into the first preset container.

7. The apparatus for order processing according to claim 6, wherein the operations further comprise:
determining a volume difference between the volume threshold and the sum of the volumes, in response to the sum of the volumes of the at least one item indicated by the order being less than the volume threshold;
determining whether there is a target order in a specified to-be-selected order set, the target order being a to-be-selected order having a sum of volumes of at least one item indicated whereby less than the volume difference; and
incorporating, in response to there being the target order in the specified to-be-selected order set, the target order into the to-be-selected order set.

8. The apparatus for order processing according to claim 6, wherein the determining, based on the storage-bin region information and the volume information, whether the order satisfies following conditions: the at least one item indicated by the order being located within one storage-bin region, and a sum of volumes of the at least one item being below a volume threshold comprises:
determining whether the at least one item indicated by the order is located within the one storage-bin region based on the storage-bin region information;
determining whether the sum of the volumes of the at least one item indicated by the order is below the volume threshold based on the volume information, in response to the at least one item indicated by the order being located within the one storage-bin region; and
determining the order satisfying the conditions, in response to the sum of the volumes of the at least one item indicated by the order being below the volume threshold.

9. The apparatus for order processing according to claim 6, wherein after the determining the order as a to-be-selected order to generate a to-be-selected order set, the method further comprises:
sending a spatial location allocation instruction to a spatial location allocating apparatus, the spatial location allocation instruction used for instructing the spatial location allocating apparatus to allocate a spatial location to the at least one item indicated by the to-be-selected order in the to-be-selected order set in a first preset container;
acquiring a height of a highest point of the allocated spatial location of the at least one item and a height of a preset spatial location of the first preset container, to determine whether the height of the highest point of the allocated spatial location of the at least one item is higher than the height of the preset spatial location; and
in response to the height of the highest point of the allocated spatial location of the at least one item being higher than the height of the preset spatial location, sending a spatial location change instruction to the spatial location allocating apparatus, the spatial location change instruction used for instructing the spatial location allocating apparatus to allocate the at least one item in the first preset container to a second preset container such that the height of the highest point of the spatial location of the at least item in the first preset container is below the height of the preset spatial location.

10. The apparatus for order processing according to claim 6, wherein the preset order comprises items having identical identifiers, or storage bins of items comprised in the present order are adjacent.

11. A non-transitory computer readable storage medium, storing a computer program thereon, wherein the program, when executed by a processor, causes the processor to perform operations, the operations comprising:
acquiring order information of a to-be-processed order from the order, the order information including storage-bin region information and volume information of at least one item indicated by the order;
determining, based on the storage-bin region information and the volume information, whether the order satisfies following conditions: the at least one item indicated by the order being located within one storage-bin region of a warehouse, and a sum of volumes of the at least one item being below a volume threshold; and
in response to the order satisfying the conditions, determining the order as a to-be-selected order, to generate a to-be-selected order set,
in response to the order not satisfying the conditions and the order matching a preset order, sending by the electronic device a storage-bin region allocation instruction to a storage-bin region allocating apparatus, for instructing the storage-bin region allocating apparatus to move the at least one item indicated by the order into the one storage-bin region of the warehouse, and returning to execute the determining whether the order satisfies the conditions; and
sending, by the electronic device, a spatial location allocation instruction to a spatial location allocating apparatus, for instructing the spatial location allocating apparatus to stack at least one item indicated by a to-be-selected order in the to-be-selected order set into a first preset container,
wherein the operations further comprise:
moving, by the storage-bin region allocating apparatus, in response to the storage-bin region allocation instruction, the at least one item indicated by the order into the one storage-bin region of the warehouse; and
stacking, by the spatial location allocating apparatus, in response to the spatial location allocation instruction, the at least one item indicated by the to-be-selected order in the to-be-selected order set into the first preset container.

12. The non-transitory computer readable storage medium according to claim 11, wherein after the determining the order as a to-be-selected order, to generate a to-be-selected order set, the operations further comprise:
determining a volume difference between the volume threshold and the sum of the volumes, in response to the sum of the volumes of the at least one item indicated by the order being less than the volume threshold;
determining whether there is a target order in a specified to-be-selected order set, the target order being a to-be-selected order having a sum of volumes of at least one item indicated whereby less than the volume difference; and
incorporating the target order into the to-be-selected order set, in response to there being the target order in the specified to-be-selected order set.

13. The non-transitory computer readable storage medium according to claim 11, wherein the determining, based on the storage-bin region information and the volume information, whether the order satisfies following conditions: the at least one item indicated by the order being located within one storage-bin region, and a sum of volumes of the at least one item being below a volume threshold comprises:

determining whether the at least one item indicated by the order is located within the one storage-bin region based on the storage-bin region information;

determining whether the sum of the volumes of the at least one item indicated by the order is below the volume threshold based on the volume information, in response to the at least one item indicated by the order being located within the one storage-bin region; and determining the order satisfying the conditions, in response to the sum of the volumes of the at least one item indicated by the order being below the volume threshold.

14. The non-transitory computer readable storage medium according to claim 11, wherein after the determining the order as a to-be-selected order to generate a to-be-selected order set, the operations further comprise:

sending a spatial location allocation instruction to a spatial location allocating apparatus, the spatial location allocation instruction used for instructing the spatial location allocating apparatus to allocate a spatial location to the at least one item indicated by the to-be-selected order in the to-be-selected order set in a first preset container;

acquiring a height of a highest point of the allocated spatial location of the at least one item and a height of a preset spatial location of the first preset container, to determine whether the height of the highest point of the allocated spatial location of the at least one item is higher than the height of the preset spatial location; and in response to the height of the highest point of the allocated spatial location of the at least one item being higher than the height of the preset spatial location, sending a spatial location change instruction to the spatial location allocating apparatus, the spatial location change instruction used for instructing the spatial location allocating apparatus to allocate the at least one item in the first preset container to a second preset container such that the height of the highest point of the spatial location of the at least item in the first preset container is below the height of the preset spatial location.

15. The non-transitory computer readable storage medium according to claim 11, wherein the preset order comprises items having identical identifiers, or storage bins of items comprised in the present order are adjacent.

* * * * *